United States Patent
Geske et al.

(10) Patent No.: US 11,223,297 B2
(45) Date of Patent: Jan. 11, 2022

(54) MODULAR MULTIPOINT POWER CONVERTER AND METHOD OF OPERATING IT

(71) Applicant: GE Energy Power Conversion Technology Limited, Rugby (GB)

(72) Inventors: Martin Geske, Berlin (DE); Duro Basic, Berlin (DE)

(73) Assignee: GE ENERGY POWER CONVERSION TECHNOLOGY LTD, Warwickshire (GB)

(*) Notice: Subject to any disclaimer, the term of this patent is extended or adjusted under 35 U.S.C. 154(b) by 873 days.

(21) Appl. No.: 15/755,771

(22) PCT Filed: Aug. 22, 2016

(86) PCT No.: PCT/EP2016/069798
§ 371 (c)(1),
(2) Date: Jul. 9, 2018

(87) PCT Pub. No.: WO2017/032740
PCT Pub. Date: Mar. 2, 2017

(65) Prior Publication Data
US 2020/0350836 A1    Nov. 5, 2020

(30) Foreign Application Priority Data
Aug. 26, 2015  (EP) .................................. 15182552

(51) Int. Cl.
*H02M 7/483* (2007.01)
*H02M 7/797* (2006.01)

(52) U.S. Cl.
CPC ........... *H02M 7/797* (2013.01); *H02M 7/483* (2013.01)

(58) Field of Classification Search
CPC .... H02M 7/797; H02M 7/483; H02M 1/0085; H02M 7/4835
See application file for complete search history.

(56) References Cited

U.S. PATENT DOCUMENTS 10,367,407 B2 * 7/2019 Geske ................... H02M 7/757
10,530,275 B2 * 1/2020 Vasiladiotis ........ H02M 7/4835
(Continued)

FOREIGN PATENT DOCUMENTS

DE      101 03 031 A1      7/2002
DE   10 2010 046 142 A1    3/2012
(Continued)

OTHER PUBLICATIONS

Antonopoulos, A., et al., "On dynamics 1-20 and voltage control of the Modular Multilevel Converter," 13th European Conference on Power Electronics and Applications, pp. 1-10 (Sep. 8-10, 2009).
(Continued)

*Primary Examiner* — Kyle J Moody
(74) *Attorney, Agent, or Firm* — Wood IP LLC

(57) ABSTRACT

A modular multipoint power converter for converting an AC voltage to a DC voltage or vice versa, and a method of operating it are provided. The multipoint power converter has a converter branches, whereby two converter branches are connected to each other respectively to form a phase branch of the converter. Each converter branch has a plurality of similar submodules, each of which is formed from a half-bridge circuit with power semiconductor switches. The branch currents through the converter branches are controlled in operation by increasing the DC component of the DC current or the DC intermediate circular current such that a unipolar current flows through the converter branches. As a result, with the same plurality of submodules per converter branch, the transmissible power can be increased, the power semi-conductor elements can be better utilized, or the plurality of submodules can be reduced while the transmissible power remains the same.

17 Claims, 8 Drawing Sheets

(56) References Cited

U.S. PATENT DOCUMENTS

| | | | | |
|---|---|---|---|---|
| 2010/0118578 A1* | 5/2010 | Dommaschk | ......... | H02M 7/483 363/127 |
| 2012/0243282 A1* | 9/2012 | Marquardt | .............. | H02M 7/49 363/132 |
| 2014/0146583 A1 | 5/2014 | Trainer et al. | | |
| 2016/0380551 A1* | 12/2016 | Hoerger | .................. | H02M 7/04 363/65 |
| 2017/0214311 A1* | 7/2017 | Friedrich | .............. | H02M 7/483 |

FOREIGN PATENT DOCUMENTS

| | | |
|---|---|---|
| DE | 10 2011 086 087 A1 | 5/2013 |
| EP | 1 497 911 B1 | 10/2005 |
| EP | 2 782 239 A1 | 9/2014 |

OTHER PUBLICATIONS

Rasic, A., et al., "Optimization of the modular multilevel converters performance using the second harmonic of the module current," 13th European Conference on Power Electronics and Applications, pp. 1-10 (Sep. 8-10, 2009).

Extended European Search Report and Opinion issued in connection with corresponding EP Application No. 15182552.8 dated Mar. 18, 2016.

International Search Report and Written Opinion issued in connection with corresponding PCT Application No. PCT/EP2016/069798 dated Dec. 1, 2016.

International Preliminary Report on Patentability issued in connection with corresponding PCT Application No. PCT/EP2016/069798 dated Feb. 27, 2018.

* cited by examiner

MODULAR MULTIPOINT POWER CONVERTER AND METHOD OF OPERATING IT

FIELD OF THE INVENTION

This invention relates to a modular multipoint power converter for converting an AC voltage to a DC voltage or vice versa, and a method of operating such a modular multipoint power converter.

BACKGROUND

Converters for converting direct current to alternating current and vice versa are used for many applications, e.g. for coupling electrical networks with variable speed drives for energy exchange between two electrical networks, etc. For this purpose, converters are known in various circuit topologies and configurations. For smaller and medium-sized powers, conventional two-phase converters are known which offer simple and robust solutions and are widely used.

With continuous development of power semiconductor switches, ever newer converter topologies are desired and developed for ever higher power and voltage ranges. In the medium and high-voltage range, so-called modular multi-level converters are increasingly used to generate a plurality of voltage levels and to increase the voltages to higher levels up to ranges of high-voltage direct-current (HVDC) transmission.

The modular multilevel converter (MMC and M2C) represents a relatively innovative converter topology. This converter comprises phase modules, which consist of two series-connected branches, whereby each branch is built from a number of similar cells (submodules). Each submodule is formed from a bridge circuit with controllable power semiconductor switches and an internal capacitor for temporary storage of electrical energy. The bridge circuit can be a half bridge with two controllable power semiconductor switches connected in series, or else a H or full bridge, which has two parallel power semiconductor branches connected to the intermediate circuit, in each of which two power semiconductor switches are arranged in series with one another. A free-wheeling diode is assigned antiparallel to each controllable switch. Due to the modular design, the converter is individually scalable for different powers and applications. The voltages and currents on the AC and DC side can be controlled and regulated in a highly dynamic way and largely decoupled from one another.

Such a modular multilevel converter is known e.g. from DE 101 03 031 A1, where the submodules are designed in the manner of a half-bridge.

Modular multipoint power converters with submodules in the form of asymmetric full or half-bridges are known, for example, from DE 10 2010 046 142 A1 and DE 10 2011 086 087 A1.

EP 1 497 911 B1 describes further submodule configurations which are suitable for use in modular multipoint power converters.

In practice, modular multipoint power converters operate in an operating mode with continuous bidirectional branch current. In continuous bidirectional branch current operation, the power semiconductors of the submodules are controlled such that a bidirectional, e.g. sinusoidal, branch current flows through each power converter branch. The branch current may have a DC component resulting from the DC current in the DC intermediate circuit.

There remains a need to increase the power transmissible by a modular multipoint converter. This should be done if possible without an increase in the cost of the circuit arrangement and the control of the converter and at high efficiencies of the converter. Conversely, there is a desire to reduce the number of submodules or power semiconductors in them if possible for a given nominal power of the power converter or to better utilize the power semiconductor devices.

SUMMARY

On this basis, it is an object of this invention to provide a modular multipoint power converter and a method of operating i, which are suitable for the transmission of high powers at high efficiencies. In particular, it is an object of this invention to propose simple measures to increase, if necessary, the transmissible power of the power converter and/or to reduce the number of submodules or power semiconductors for a given transmissible power, if possible without increasing the circuitry and/or control engineering effort significantly.

This object is solved by a modular multipoint power converter with the features disclosed herein and by a method of operating a modular multilevel converter having the features disclosed herein. Particularly advantageous embodiments according to the invention are the object of the dependent claims.

According to one aspect of the invention, a modular multipoint power converter is provided for converting an AC voltage to a DC voltage or vice versa, comprising a plurality of power converter branches or arms, each power converter branch including a number of submodules, and whereby each submodule is formed by a bridge circuit with at least two power semiconductor switches. The modular multipoint power converter further comprises a controller for controlling the operation of the multipoint power converter, the controller having control logic arranged to control the branch current through the power converter branches such that a unipolar current flows through each power converter branch.

The modular multipoint power converter thus has a modular design with a plurality of identical or identical submodules offering the inherent advantages of modularity and scalability. In addition, the controller is arranged to control the branch currents, such that a unipolar current flows through each power converter branch. In preferred embodiments, this is a unidirectional or unipolar, continuous, substantially sinusoidal branch current whose average is equal to or greater than the peak amplitude of the AC component or sine waveform of the branch current, such that the current has only a single either positive or negative polarity. Here, harmonic components, in particular the 2nd harmonic, be considered a circular current. Alternatively, the unipolar current may be a unidirectional, discontinuous, substantially sinusoidal current having nonconducting phases up to half a period of the fundamental frequency of the AC voltage, whereby the DC intermediate current is approximately equal to or slightly greater, in particular between 1 and 20 percent greater, around 1 to 10 percent, than the mains current peak.

The unipolarity of the branch currents can be achieved by increasing the DC component of the branch currents of the power converter branches. The increase in the DC component thus results in an increase in the transmitted power or an increased utilization of the semiconductor elements with a constant number of submodules per converter branch. Conversely, for a given power to be transmitted and increased DC component of the branch current, the branch voltage can be reduced so that the number of submodules per power converter branch can be reduced.

Each power converter branch has a series connection of at least two submodules, interconnected in such a way that a first AC voltage connection of at least one submodule is electrically connected to a second AC voltage connection of a similar adjacent submodule. The submodules form two-terminal circuits connected in series or cascade.

The power converter can have one, two, or three or even more than three phases with a corresponding number of phase branches or modules connected between a positive and a negative intermediate DC voltage terminal of the multipoint power converter. Each phase branch contains two identical or similar series-connected power converter branches, whereby a connection point between the two power converter branches of each phase branch is connected to an AC voltage terminal of the multipoint power converter. Each power converter branch may further include an inductance for decoupling the power converter branch from other power converter branches.

The submodules can have different configurations. Half-bridges, however, cannot be used here due to the unidirectional voltage polarity of the submodules. Preference is given to full or half-bridge circuits with two parallel power semiconductor branches connected between a first and a second DC node of the submodule and in each of which at least one controllable power semiconductor switch is arranged, to which a free-wheeling diode can, but does not need to be, connected in antiparallel. Each submodule also has a capacitor connected in parallel with the half-bridge circuit between the first and second DC voltage nodes and is used for the intermediate storage of energy as a DC voltage intermediate capacitor. Thus, the DC intermediate circuit of the multipoint power converter is formed by the series connection of the DC intermediate circuit capacitors of the submodules. The half-bridge circuit has AC terminals connected to the circuit of the modular multipoint converter with adjacent submodules, whereby, between the AC terminals of the half-bridge circuit of each submodule, depending on the switching state of the power semiconductor switches, the positive or negative voltage of the capacitor or the voltage 0 is applied.

In one embodiment, each power semiconductor branch of a half-bridge circuit has two series-connected power semiconductor switches, to each of which an antiparallel free-wheeling diode is assigned and whose connection points form a first or second AC voltage connection of the submodule. Such a half-bridge or full bridge is also referred to as a symmetrical half-bridge. In an embodiment, after each power converter branch carries a unipolar current, only two switches on a bridge diagonal need to be driven by the four power semiconductor switches of each submodule to create all the required switching states of the submodule for operating the power converter. The other two power semiconductor switches on the other bridge diagonal can remain switched off, which significantly reduces the switching losses compared to the conventional operation of symmetrical half-bridges.

In another embodiment, the submodule may be provided with an asymmetric or reduced half-bridge or full bridge with a first power semiconductor branch with a series circuit of a first power semiconductor switch and a first diode, and a second power semiconductor branch with a series connection of a second power semiconductor switch and a second diode, whereby the first and second diodes are arranged in a bridge diagonal of the bridge circuit and each power semiconductor switch is assigned to an antiparallel free-wheeling diode. Optionally, the free-wheeling diode can also be omitted.

With the use of asymmetric half-bridges, by providing continuous unidirectional branch currents compared to a discontinuous branch current mode of operation for the same nominal power, the number of cells or submodules can be reduced. By reducing the DC voltage of the DC intermediate circuit of the power converter, a smaller number of submodules is required for the same power transmission. Conversely, regardless of whether they are symmetrical or asymmetrical, the half-bridges can be used in the case of excessively high branch currents for overload situations. This can be done without additional submodules and even using only two power semiconductor switches per submodule, insofar as the boundary conditions for increased power transmission are fulfilled. However, increasing the intermediate circuit DC voltage of the multipoint converter to increase the power transfer as needed would require more submodules, which would increase the overheads and cost of the system. On the other hand, the increase in the intermediate voltage also sets technical limits, as given e.g. by XLPE cables, which are currently often used for high-voltage direct current transmission.

In order to control the branch currents appropriately, the modular multipoint power converter has a monitoring device which is set up to monitor at least one characteristic variable of a branch current by at least one power converter branch. The monitoring makes it possible to dynamically adjust the branch current according to the given operating and environmental conditions.

In one embodiment, the monitoring device is configured to directly measure the branch current in each power converter branch with corresponding current measuring transducers. This can easily be used to calculate the required DC offset value or additional DC component required to make the branch current unidirectional.

In an alternative embodiment, the monitoring device is set up to measure an intermediate circuit DC current and phase currents in all AC phase outputs of the multipoint power converter. The latter measured values are also required for the current regulation of the multipoint power converter. Since the intermediate DC current can be distributed substantially uniformly over all phase branches, from these variables it is easy to determine the course of the respective branch currents.

In a particularly preferred embodiment, the controller has a regulating device for regulating the branch current through the power converter branches. For the regulation, we use the variable detected by the monitoring device which identifies the branch current through the at least one power converter branch. By a suitable control, e.g. a proportional-integral (PI) control, stationary deviations of the actual branch currents from the desired branch currents can be prevented or corrected. In addition, the dynamic behavior, including the fault behavior, can be improved.

The controller can easily control or regulate the branch current by increasing the DC current offset or DC component of the branch current or the intermediate circuit direct current, e.g. by controlling the target value of the latter.

In an advantageous embodiment, the controller may be adapted to actively superimpose a circular current of the 2nd harmonic of a branch current to achieve operation with unidirectional branch current while adjusting the DC voltage and/or to modify the relationships between AC and DC side currents and voltages of the power converter.

In a further advantageous embodiment, the controller may be set up to actively superimpose a circular current of the 2nd harmonic to a branch current, to achieve unidirectional branch current operation while minimizing the ripple voltage of DC intermediate capacitors of the submodules.

In the case of the last-mentioned advantageous embodiments, the controller can be a regulator unit for regulating the circular currents of the 2nd harmonic.

According to another aspect of the invention, a method is provided for operating a modular multipoint power converter including a plurality of power converter branches each with a number of submodules, each submodule being formed from a bridge circuit with at least two power semiconductor switches. The method comprises driving the power semiconductor switches of all submodules in response to current operating conditions and according to a predetermined modulation to convert an input AC voltage of the multipoint power converter into an output DC voltage or vice versa. The method further comprises controlling the branch currents through the power converter branches in such a way that a unipolar current flows through the power converter branches, i.e. a unidirectional, continuous, possibly discontinuous, e.g. substantially sinusoidal current, that is always not negative (or not positive). This is independent of whether the submodule terminal voltage is positive, negative or zero. The method has the developments and advantages mentioned above in connection with the modular multipoint power converter.

The above-mentioned method may further comprise the monitoring of at least one variable indicative of a branch current through the power converter branches, where the control or regulation of the branch currents may include regulating the branch currents dependent on the at least one monitored variable. The control allows faults and operational transients to be compensated and permanent deviations in the branch currents to be prevented.

The control or regulation of the branch currents can be performed based on an increase in a DC current target value or DC component of a branch current or the intermediate circuit DC current.

In advantageous embodiments of the method, the control or regulation of the branch currents may be based on an active superimposition of a circular current of the 2nd harmonic, while at the same time at least one of the following can be performed: Adaptation of the DC voltage; modification of the relationships between the AC and DC side currents and voltages of the power converter; and/or minimization of the ripple voltage of capacitors of the submodules.

In any case, the operating method and the modular multipoint power converter are set up by increasing a direct current average value and the effective value of the DC currents to increase the transferable DC power or better exploit the power semiconductor device or with constant transmissible power, the voltage of the DC intermediate circuit and thus reduce the number of submodules required.

BRIEF DESCRIPTION OF THE DRAWINGS

Further advantageous details of embodiments of the invention result from the claims, the drawings and the associated description. In an embodiment described in more detail below by reference to a drawing, which shows exemplary, by no means limiting embodiments of the invention, wherein the same reference signs are used in all figures to indicate the same elements. The drawings in detail:

DETAILED DESCRIPTION

Figure 1:
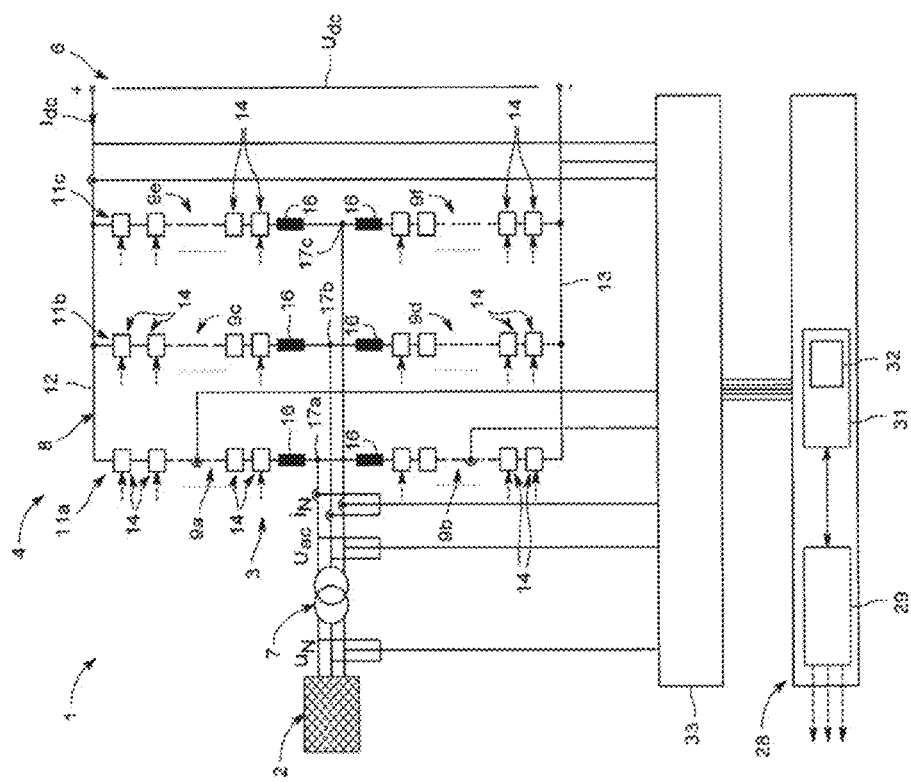
FIG. 1 shows an exemplary system with a modular multilevel converter, built from a plurality of submodules, for coupling a power grid of an electric motor or another AC voltage source with an another grid or a load to illustrate an exemplary application of the invention in the form of a simplified block diagram.

FIG. 1 shows in a simplified representation a system 1, which is suitable for a high-voltage direct current power distribution system for the electrical energy transmission with high DC voltage, or for many other applications. The system 1 comprises here for example a three-phase AC voltage source 2, which can for example be an electric energy supply grid, an electrical alternating current (AC) machine, an AC generator, a wind power plant or the like. An electrical inverter 4 is connected to the alternating voltage source 2 with its alternating voltage side 3, the DC voltage side 6 of which can be connected to a different electrical power supply network or electrical converter, similar or identical to the inverter 4, by means of a direct current transmission device not shown here. The connection of the inverter 4 to the alternating voltage source 2 can optionally take place via a transformer 7.

The converter 4 comprises at least a first converter 8, which can be a rectifier to convert an alternating voltage $u_N(t)$ of the AC voltage source 2 to a direct voltage $U_{dc}$ on the output side. Optionally, the converter 4 might comprise a further converter, not shown here, which converts the voltage $U_{dc}$ to a suitable alternating voltage for another grid or an electric drive or is connected in parallel to the first converter 8. It is understood that the functions of the converters reverse if the flow of energy occurs reverse to the power grid or the voltage sink 2.

As can be seen from FIG. 1, the converter 8 here comprises six converter branches 9A-9F, of which each two, an upper and a lower 9A, 9B or 9C, 9D or 9E form a respective phase branch 11A, 11B or 11C. Each phase branch 11*a*, 11*b*, 11*c* extends between a positive power rail or a positive DC voltage connection ("+") 12 of the converter 8 and a negative power rail or a negative DC voltage connection ("−") 13.

As further shown in FIG. 1, each converter branch here comprises a series connection of multiple converter submodules or modular switches 14 connected in series. The controllable direct voltage $U_{dc}$ at the DC voltage connections 12, 13 of the converter 8 can be dynamically changed via the switching states of the individual converter submodules 14. The number of converter submodules 14 thereby determines the available number of converter switching states, which allow a fine voltage grading and a voltage form of high quality as well as high voltage levels up to the range of the high-voltage direct current (HVDC) transmission. The converter 8 is therefore a modular multilevel or multi-point converter. The submodules 14 are explained in more detail below in connection with FIGS. 2 and 7.

In the converter branches 9A-9F, circuit-current-limiting inductances 16 can be provided, which support decoupling of the converter branches from one another. At the connection point between the associated converter branches 9A, 9B, 9C, 9D or 9E the respective AC voltage connections 17A, 17B, 17C of the converter 8 are led out, which are connected to the AC voltage source 2. The direct voltage side connections of the first, most upper submodules 14 of the converter 8 are connected with each other and with the positive power rail 12. Similarly, the direct voltage side connections of the last, lowest submodules 14 are connected with each other and with the negative power rail 13. Between the power rails 12, 13 the direct voltage $U_{dc}$ is present, which can be a high voltage, for example, over 100 kV.

Figure 2:
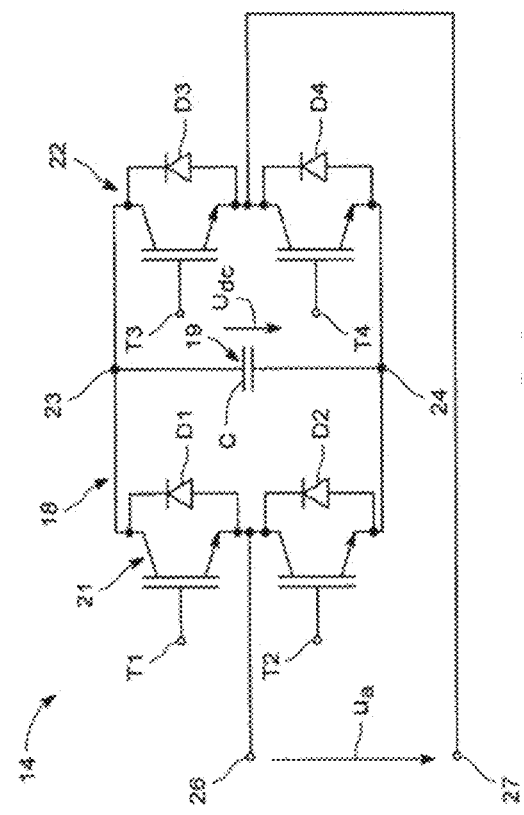
FIG. 2 shows a simplified circuit diagram of a converter submodule with a full-bridge topology, which can be used in the modular multilevel converter according to FIG. 1 according to the invention.

FIG. 2 shows, in the form of a simplified circuit diagram, a known topology of a submodule or modular switch 14, as can be used in the multipoint power converter 8 of the type shown in FIG. 1.

The bidirectional submodule 14 according to FIG. 2 similarly has a bridge circuit 18 and a capacitor C, 19 parallel-connected to the bridge circuit 18. The bridge circuit 18 is here arranged as a so-called symmetrical half-bridge with two parallel power semiconductors 21, 22 connected in parallel to each other between a first and a second direct voltage node 23, 24. The first power semiconductor branch 21 has a series connection of a first power semiconductor switch T1 and a second power semiconductor switch T2, where the first and second power semiconductor switches T1, T2 are assigned to an antiparallel or free-wheeling diode D1 or D2 connected in parallel in opposite directions. The free-wheeling diodes D1, D2 serve to conduct operating current with the switched-off power semiconductor switches T1 or T2 and to protect the associated power switches against inadmissible overvoltages or blocking voltages.

Similarly, the second power semiconductor branch 22 has a series arrangement of a third and fourth power semiconductor switch T3, T4, to each of which a free-wheeling diode D3 or D4 is connected in antiparallel. The free-wheeling diodes D3, D4 perform the same function as the free-wheeling diodes D1, D2.

The power semiconductor switches T1-T4 are controllable switches, which are here formed from IGBTs (insulated gate bipolar transistors). In principle, however, it would also be possible to use other transistors, such as field-effect transistors, in particular MOSFETs, gate turn-off (GTO) thyristors, integrated gate-commutated thyristors (IGCTs) and other comparable switchable electronic components. The terms collector, emitter and gate electrode used herein refer to the preferred use of IGBTs as the power semiconductor switches T1-T4 of the bridge circuit 18, whereby for the person skilled in the art, the corresponding designations for terminals and electrodes of other similar semiconductor components are commonly used.

As shown in FIG. 2, the emitter of the first power semiconductor switch T1 is connected to the collector of the second power semiconductor switch T2, whereby the connection point forms a first AC voltage terminal 26 of the submodule 14, which may optionally be an input or output terminal. The emitter of the third power semiconductor switch T3 is thus connected to the collector of the fourth power semiconductor switch T4, whereby the connection point forms a second AC voltage terminal 27 of the submodule 14, which may optionally be an input or output terminal.

The two parallel-switched series circuits or power semiconductor branches 21, 22 are switched in parallel to the capacitor C serving as energy storage 19, which can also be referred to as a DC voltage intermediate capacitor of the submodule 14. The DC voltage $u_{dc}$ across the capacitor C is always positive due to the wiring of the free-wheeling diodes D1-D4 and may, according to the design and application, e.g. be between a few hundred volts and a few kV. The terminal voltage $u_a$ between the AC terminals 26, 27 of the submodule 14 can generally assume the values $-u_{dc}$, $+u_{dc}$ or 0. The DC voltage $u_{dc}$ on the capacitor C may become larger or smaller. In principle, a current can flow through the submodule 14 in both directions, i.e. from the terminal 26 to the terminal 27 or vice versa from the terminal 27 to the terminal 26. As explained in detail below, the submodules 14 are suitably driven according to the invention such that each submodule 14 in the modular multipoint power converter 8 according to FIG. 1 always has a unidirectional, i.e. only a unipolar, continuous current, e.g. an either positive or negative substantially sinusoidal current flows in only one direction, e.g. from the terminal 26 to the terminal 27.

Again referring to FIG. 1, a controller 28 can further be seen, which is provided to control the operation of the converter 8 appropriately based on the present operating conditions. For the sake of clarity, the control paths are indicated in FIG. 1 with dashed arrows only in a few locations. In particular, via a controller 29, the controller 28 controls the power semiconductor switches T1-T4 of the submodules 14 of all converter branches 9A-F in order to generate, from the mains voltage $u_N(t)$ or its transformed voltage on the alternating-voltage terminals 17A-C, a desired DC voltage $U_{dc}$ between the DC voltage terminals 12, 13 of the converter 8 or vice versa. The switching signals s(t) suitable for this purpose are determined by an associated control logic 31 which, depending on the configuration, can also contain a controller 32 for controlling the branch currents through the power converter branches 9A-F. The controller 28 with its function blocks 29, 31 and 32 is described in more detail below in connection with the FIGS. 4 to 11.

The controller 28 controls the operation of the power converter 8 depending on parameters which are continuously measured or determined by a monitoring device 33 during operation. In FIG. 1, exemplary measurement paths are shown, although some have been omitted for clarity. As shown, e.g. all phases of the mains voltage $u_N(t)$ and/or, if a transformer 7 is used, the phase voltages at the AC voltage terminals 17A-C can be measured. In addition, the phase currents at the AC voltage terminals 17A-C can be measured directly. Still further, the branch currents $i_q(t)$ in the power converter branches 9a-f and/or the intermediate circuit current $I_{dc}$ are measured directly with corresponding current transformers. In addition, the potentials at the DC voltage terminals 12, 13 are detected in order to determine the voltage $U_{dc}$ of the DC intermediate circuit. Other variables than those stated here may also be measured, and some variables may be determined from other variables with generally known relationships for electrical currents and voltages.

Figure 3:
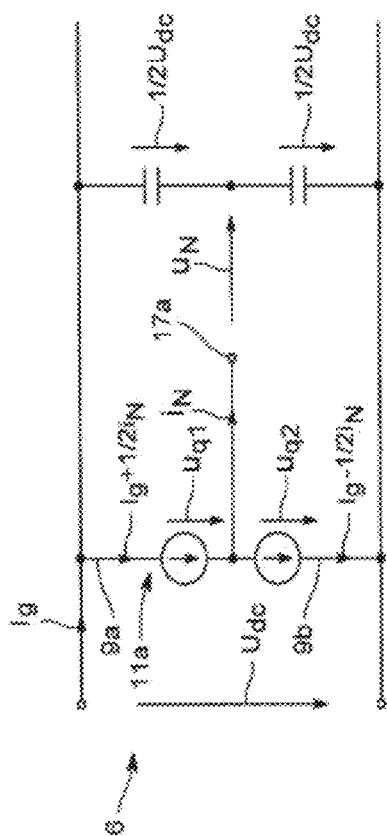
FIG. 3 shows an equivalent circuit diagram of a phase arm of the modular multipoint power converter according to FIG. 1, in a greatly simplified schematic representation.

To understand the operation of the modular multipoint power converter 8 according to the invention, reference is first made to FIG. 3, which shows an equivalent circuit diagram of one phase branch of the phase branches 11A-C, whereby here, as an example only, phase branch 11a is considered with the upper power converter branch 9a and the lower power converter branch 9B. As shown, the submodules 14 of a branch can be summarily replaced in the corresponding ideal control by ideally controlled voltage sources $u_{q1}$, $u_{q2}$. The two voltage sources $u_{q1}$, $u_{q2}$ are loaded symmetrically. The voltage $U_{dc}$ between the DC voltage terminals 12, 13 is assumed to be constant and is distributed evenly across the series connection of the capacitors C, 19 in the upper and lower power converter branches 9A, 9B. The maximum adjustable voltage amplitude $\hat{u}_N$ of a phase module thus relates to $\frac{1}{2}U_{dc}$.

The current in a power converter branch 9A-F, i.e. in the voltage source $u_{q1}$, $u_{q2}$, is the sum of the DC component Ig in the phase module 11a-c and the half AC component $\frac{1}{2}i_N(t)$. In the case of a symmetrical design, therefore, the current $I_g + \frac{1}{2}i_N(t)$ flows e.g. through the upper converter branch 9A, while the current $I_g - \frac{1}{2}i_N(t)$ flows through the lower converter branch 9B.

The number of required submodules 14 per converter branch 9a-f is determined by the maximum branch voltage $$\hat{U}_q = \sqrt{2} \cdot U_N + \frac{1}{2} \cdot U_{dc} \quad (\text{Eq. 1}),$$

whereby $U_N$ is the RMS value of the AC voltage $u_N(t)$, and the DC voltage of the intermediate circuit capacitors C, 90 of the submodules 14, $u_{DC}$, defined as follows:

$$N_q = \text{ceil}(\hat{U}_q / u_{dc}) \quad (\text{Eq. 2}),$$

whereby ceil(x) is the rounding function that assigns the nearest not smaller integer to the real number x.

The transmitted DC power $P_{dc} = U_{dc} \cdot I_{dc}$ corresponds to the withdrawn AC power Pac, such that the following relationship (power balance equation) applies to an n-phase power converter:

$$n/2 \cdot \hat{U}_N \cdot \hat{I}_N = U_{dc} \cdot I_{dc} \quad (\text{Eq. 3}).$$

Figure 4:
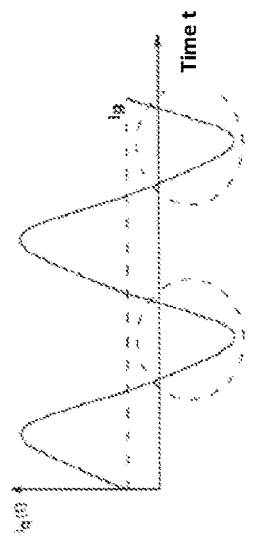
FIG. 4 shows an exemplary course of a branch current in the conventional bidirectional operating mode.

For a further understanding of the operation of the modular multipoint power converter 8 according to the invention, refer to FIGS. 4 and 5. FIG. 4 shows a conventional operating mode in which the branch current $i_q(t)$ is a continuous, bidirectional, substantially sinusoidal current.

As already explained in relation to FIG. 3, this current is the sum of a direct current component $I_g$ in the phase branch 11a-c and the half AC component $\frac{1}{2}i_N(t)$. In an n-phase power converter 8, the DC component $I_g$ corresponds to one nth of the DC current $I_{dc}$ in the DC intermediate circuit. As shown, the branch current $i_q(t)$ is positive over a period greater than half the period of the AC component, and negative in the remaining time of the period, as shown by a dashed circle in FIG. 4.

Figure 5B:
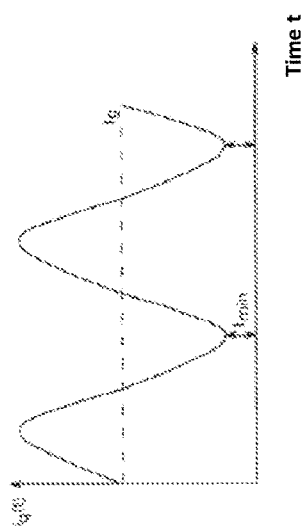
FIGS. 5A and 5B show exemplary idealized courses of branch flows in a continuous or discontinuous branch current operating mode according to the invention, in a greatly simplified representation.
Figure 5A:
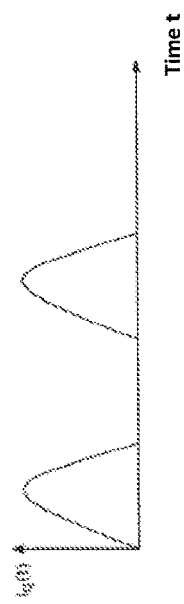

FIG. 5A shows a first, discontinuous operating mode according to the invention which is similar to half-wave rectification. A branch current $i_q(t)$ over time t is shown in a highly simplified form with omission of the resulting harmonics and other interference signals. As shown, e.g. the converter branch 9A, 9C, 9E, connected to the positive DC voltage terminal 12 conducts the positive half-wave of the converter current, while the branch current for the period of the negative half-wave is zero. Accordingly, the converter branch 9B, 9D, 9F, connected to the negative overvoltage terminal 13 conducts the negative half-wave of the power converter current, while the branch current during the positive half-wave is zero. Therefore, this operating mode is also referred to as a discontinuous current operating mode. By suitable control of the power semiconductor switches T1-T4 in the submodules 14 of the upper converter branches 9A, 9C, 9E and the lower converter branch 9B, 9D, 9F, it can be achieved that a discontinuous unipolar current approximately in a half-wave always flows through each converter branch 9A-9F. In an embodiment, only 2 of the 4 power semiconductor switches T1-T4, i.e. either T1, T4 or T2, T3, must be controlled here in order to implement this discontinuous unidirectional current operating mode. However, as shown in FIG. 5A, the RMS values are relatively low compared to the relatively high peak values of the branch currents. The transmissible power of the power converter 8 is thus limited or the semiconductor switches T1-T4 are only insufficiently utilized, for which reason the continuous operating mode described below according to FIG. 5B is preferred.

FIG. 5B shows a continuous unidirectional current operating mode according to the invention. As shown, the branch current $i_q(t)$ is controlled by the control logic 31 of the controller 28 such that the branch current $i_q(t)$ is continuous and always either positive (or at least non-negative) or negative (or at least non-positive) This is achieved by setting the DC voltage component $I_g$ of the branch current $i_q(t)$ substantially to a value greater than or equal to the maximum amplitude $\hat{I}_N$ of the AC component $i_N(t)$. This means that the controller 28 in operation increases the direct current $I_{dc}$ of the DC intermediate circuit such that, in all converter branches a-f, a continuous unidirectional branch current $i_q(t)$ results that has only a single polarity. As shown in FIG. 5B, the DC component $I_g$ can be set such that the branch current $i_q(t)$ is always greater in variable than 0 by at least a desired amount $I_{min}$.

By increasing the DC component $I_g$ of the branch currents in the converter branches 9A-F, such that the branch current never changes its polarity, the transmitted power can be increased without modifying the electronic power circuit by a suitable control logic 31 alone with a constant number of submodules ($N_q$) by creating corresponding conditions at the connection point of the power converter 8. This is particularly advantageous if the maximum voltage $U_{dc}$ of the DC intermediate circuit is limited, as is the case e.g. in high-voltage DC transmission cables, in which the maximum transmissible DC voltage is currently limited to $\pm 320 \text{ kV}_{dc}$ due to technology limitations.

In addition, the voltage of the DC intermediate circuit is not increased by the inventive step in order to increase the transmissible power. A higher voltage of the DC intermediate circuit of the power converter 8 would require more submodules 14, which would increase the switching and control complexity and the associated costs.

Yet another advantage of the invention is that only two of the four power semiconductor switches, e.g. the IGBTs T1-T4, of the submodule 14 (as shown in FIG. 2) are required to control the continuous unipolar branch current $i_q(t)$ and to implement bipolar terminal voltages using half-bridges. This is also apparent from FIG. 6, which shows the submodule of FIG. 2, and additionally shows the branch current paths resulting from the continuous unidirectional current operating mode for an exemplary current flow direction from the first AC voltage terminal 26 to the second AC voltage terminal 27.

Figure 6:
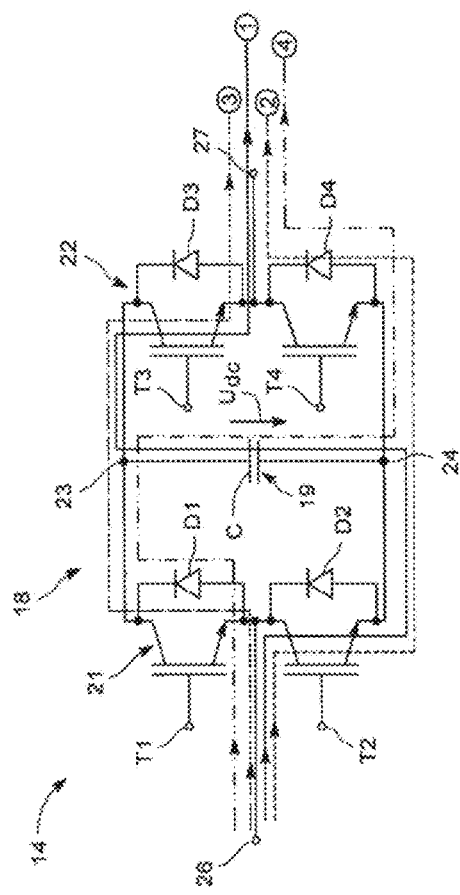
FIG. 6 shows the submodule of FIG. 2, with additional illustration of the current paths resulting from the operation of the multipoint power converter according to the invention for an exemplary current direction.

With reference to FIG. 6, in the case where the power semiconductor switches T2, T3 are both switched on and closed, the current in the submodule 14 corresponding to the branch current $i_q(t)$ flows from the AC terminal 26 via the closed switch T2, the capacitor C and the closed switch T3 to the terminal 27 as shown by the current path (1) shown by the solid line. The terminal voltage $u_a$ between the terminal 26 and the terminal 27 is $-u_{dc}$.

If the switch T2 is switched on and the switch T3 is switched off, the submodule current flows from the terminal 26 through the closed switch T2 and the free-wheeling diode D4 antiparallel to the switch T4 to the terminal 27, as shown by the dashed current path (2). The terminal voltage $u_a$ is equal to zero.

Alternatively, the switch T2 can be switched off and the switch T3 can be switched on. The branch current then flows from the terminal 26 via the free-wheeling diode D1 antiparallel to the switch T1, and the closed switch T3 to the AC voltage terminal 27 again in the same direction. This current path is shown by the dotted and dashed line (3). The terminal voltage $u_a$ is equal to zero.

Finally, for a phase in which both switches T2 and T3 are switched off, the current path (4) is shown by a dotted line in FIG. 6, whereby the branch or submodule current from the terminal 26 flows via the free-wheeling diode D1 antiparallel to the switch T1, the capacitor C, 19 and the diode D4 antiparallel to the switch C4 to the AC voltage terminal 27. The terminal voltage $u_a$ is equal to $+u_{dc}$.

In this respect, the power semiconductor switches T1, T4 for implementing the continuous unidirectional branch current $i_q(t)$ according to the invention, as shown in FIG. 5B, do not need to be controlled. This reduces the control effort and the switching losses.

Figure 7:
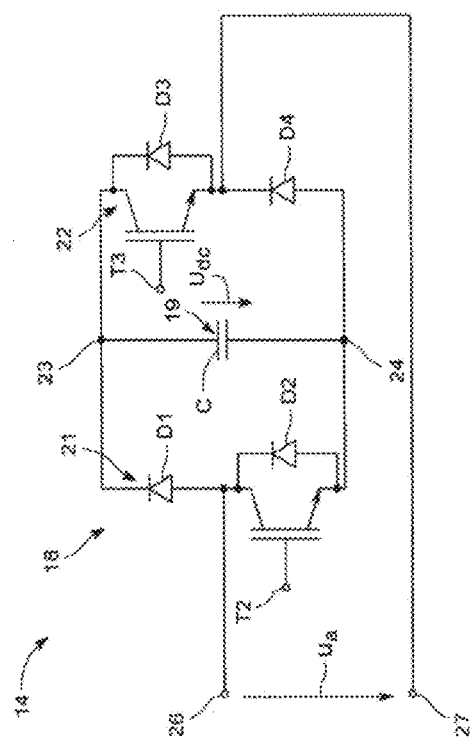
FIG. 7 shows an alternative embodiment of an asymmetrical half-bridge submodule for use in the modular multipoint power converter of FIG. 1 according to the invention.

In addition, the invention permits a reduction in the circuit complexity. The power semiconductor switches T1, T4 which are not required for the control, can be omitted. This results in a submodule 14' that can be used for the multipoint power converter 8 with the configuration of a reduced or asymmetrical half-bridge, as shown in FIG. 7. The submodule 14' according to FIG. 7 differs from that according to FIGS. 2 and 6 in that here, only the diodes D1 and D4 are provided in a half-bridge diagonal instead of the power semiconductor switches T1, T4 with associated free-wheeling diodes. Of course, depending on the circuit configuration, terminal of the submodules and the use as a DC or AC converter instead of the pair of power semiconductor switches T1, T4, the power semiconductor switches T2, T3 can be omitted on the other bridge diagonal. In any case, expensive power semiconductor elements can be saved, together with associated control units or gate drivers, which are not shown in more detail here. The circuit complexity, control complexity, and the manufacturing and operating costs are reduced.

As already explained above, the controller 28 controls the operation of the power converter 8 depending on operating variables measured or determined by the monitoring device 33. In this case, the control logic 31 also predetermines the branch currents appropriately and determines the switching function s(t) required for this, which uses the controller 29 to control the power semiconductor switches T1-T4 of the submodules 14, 14'. The control logic 31 can control the branch current iq(t) through the converter branches 9A-F using an open control path by determining a sufficient DC component $I_g$ of the branch current for a known AC component $\frac{1}{2}i_N(t)$ and, from this, determines the switching function or stationary pulse duty factor required depending on the modulation method used.

In a preferred embodiment, however, the branch current $i_q(t)$ is suitably regulated with a closed loop. For this purpose, the control logic 31 has the controller 32, which is set up, by means of the variables determined by the monitoring device, to characterize the branch currents in the converter branches 9A-F, which regulate the branch currents $i_q(t)$ through the converter branches 9A-F. A highly simplified block diagram of a possible controller 32 is shown in FIG. 8.

Figure 8:
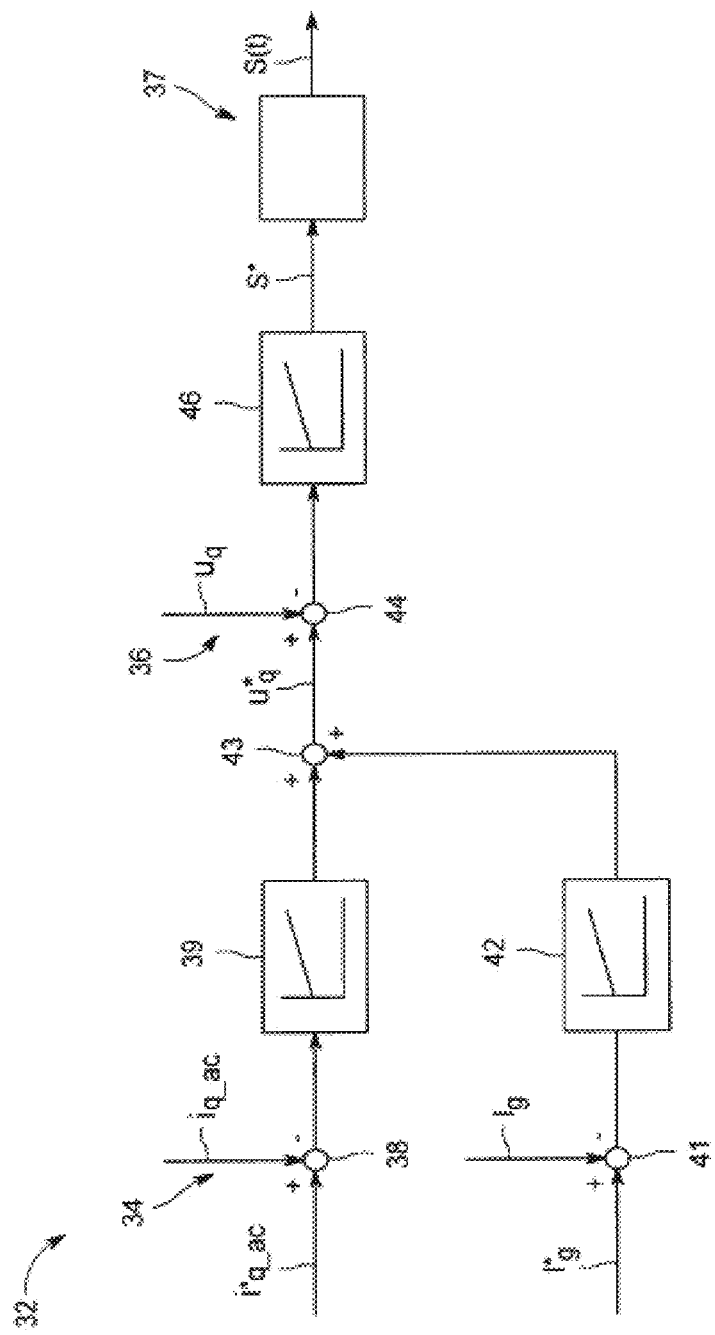
FIG. 8 shows a block diagram illustrating an exemplary controller for controlling the branch currents of the multipoint power converter according to the invention.

As shown in FIG. 8, the controller 32 here comprises a current control unit 34, a voltage control unit 36 and a modulation unit 37. The current control unit 34 first determines with an adder 38 the difference between the target value $i^*_{q\_ac}$ and the actual value $i_{q\_ac}$ of the AC component of the branch current and adds this deviation as a reference variable to a controller, a proportional-integral (PI) controller 39. In addition, the deviation between the target value $I^*_g$ and the actual value $I_g$ of the DC component of the branch current $i_q(t)$ is determined with a further adder 41 and supplied to a further controller 42. The output signals of the controllers 39, 42 are summed with an adder 43 to obtain the manipulated variable for the converter branch current. From this, the target value $u^*_q$ for the branch voltage can be determined as the reference variable for the voltage regulation unit 36 at the desired power to be transmitted.

The voltage control unit 36 uses a further adder 44 to determine the control deviation between the target value $u^*_q$ and the actual value $u_q$ of the branch voltage and supplies the difference to a further controller 44, a PI controller, in order to determine a target switching function s*(t) for controlling the power semiconductor switches T1-T4 of the submodules 14, 14' of the current branches 9A-F.

The manipulated variable s*(t) is supplied to the modulation unit 37 which, depending on the modulation method used, e.g. PWM modulation, space vector modulation or the like, the actual switching signals s(t) for the power semiconductor switches T1-T4 of the submodules 14, 14' are determined.

Thus, the controller 32 may continuously monitor the branch current $i_q(t)$ directly or indirectly by means of the monitoring device 33 and regulate it such that a continuous, unidirectional or unipolar branch current $i_q(t)$ is obtained. Of course, in addition to the control circuits according to FIG. 8, other control concepts or methods, e.g. adaptive controls, state controls, etc., can be used for this purpose.

In the following, advantageous control structures will be explained in greater detail, which may be used to obtain unidirectional and unipolar branch currents $i_q(t)$ in the converter branches 9A-F as well as additional advantageous aspects of the invention. To facilitate better understanding of these aspects, the requirements for a unidirectional or unipolar branch current must first be considered in more detail, whereby a three-phase converter 8 is considered.

At the connection points 12, 13 of the power converter 8 on the DC voltage side 6, the following applies:

$$u_{dc} = U_{dc}$$

$$i_{dc} = I_{dc}$$

At connection points 17A-C on the AC voltage side 3, the following applies:

$$u_N(t) = \hat{U}_N \cdot \cos(\omega t)$$

$$i_N(t) = \hat{I}_N \cdot \cos(\omega t - \varphi)$$

The voltages and currents at these connection points result in the following voltages and currents for a phase branch 11A-C of the power converter 8, i.e. for the voltage of a phase branch:

$$u_q(t) = \frac{U_{dc}}{2} + \hat{U}_N \cdot \cos(\omega t) \quad \text{(Eq. 4)}$$

and for the current of a phase branch:

$$i_q(t) = \frac{I_{dc}}{3} - \frac{\hat{I}_N}{2} \cdot \cos(\omega t + \varphi) \quad \text{(Eq. 5)}$$

For a unidirectional or unipolar sinusoidal branch current, the following applies $i_q(t) > 0$ and thus:

$$I_{dc} > \frac{3}{2}\hat{I}_N. \quad \text{(Eq. 6)}$$

The direct current $I_{dc}$ can be set e.g. as 1.5 times the peak voltage of the AC current. This condition can be achieved by a specific ratio between DC and AC voltage. This relationship can be shown by the power budget of the branch:

$$p(t) = \quad \text{(Gl. 7)}$$

$$u_q(t) \cdot i_q(t) = \left(\frac{U_{dc}}{2} + \hat{U}_N \cdot \cos(\omega t)\right) \cdot \left(\frac{I_{dc}}{3} - \frac{\hat{I}_N}{2} \cdot \cos(\omega t + \varphi)\right)$$

$$p(t) = u_q(t) \cdot i_q(t) =$$

$$\frac{U_{dc}}{2} \cdot \frac{I_{dc}}{3} - \frac{\hat{U}_N \cdot \hat{I}_N}{4} \cdot \cos(\varphi) - \frac{U_{dc}}{2} \cdot \frac{\hat{I}_N}{2} \cdot \cos(\omega t + \varphi) +$$

$$\frac{I_{dc}}{3} \cdot \hat{U}_N \cdot \cos(\omega t) - \frac{\hat{U}_N \cdot \hat{I}_N}{4} \cdot \cos(\omega t + \varphi).$$

It is apparent from this consideration that there is a term with constant power and two terms with oscillating power. The terms with oscillating power occur at the fundamental frequency (1st harmonic) and the 2nd harmonic and affect the resulting voltage ripple of the capacitors 19 in the bridge circuits 18 of a branch 9a-f. The average power of the capacitor 19 is zero, which must result in the following balance between the AC and DC power of the inverter:

$$\frac{U_{dc}}{2} \cdot \frac{I_{dc}}{3} - \frac{\hat{U}_N \cdot \hat{I}_N}{4} \cdot \cos(\varphi) = 0 \quad \text{(Eq. 8)}$$

$$U_{dc} \cdot I_{dc} = \frac{3}{2} \cdot \hat{U}_N \cdot \hat{I}_N \cdot \cos(\varphi).$$

Taking into account a unipolar branch current with the condition $I_{dc} = \frac{3}{2}\hat{I}_N$, the following results:

$$U_{dc} \cdot I_{dc} = \frac{3}{2} \cdot \hat{U}_N \cdot \frac{2}{3} I_{dc} \cos(\varphi).$$

According to the power budget, the voltage on the DC side must therefore be smaller than:

$$U_{dc} < \hat{U}_N \cos(\varphi) \quad \text{(Eq. 9)}.$$

This condition can be met if the voltage level of the DC side 6 is below the derived limit.

Figure 9:
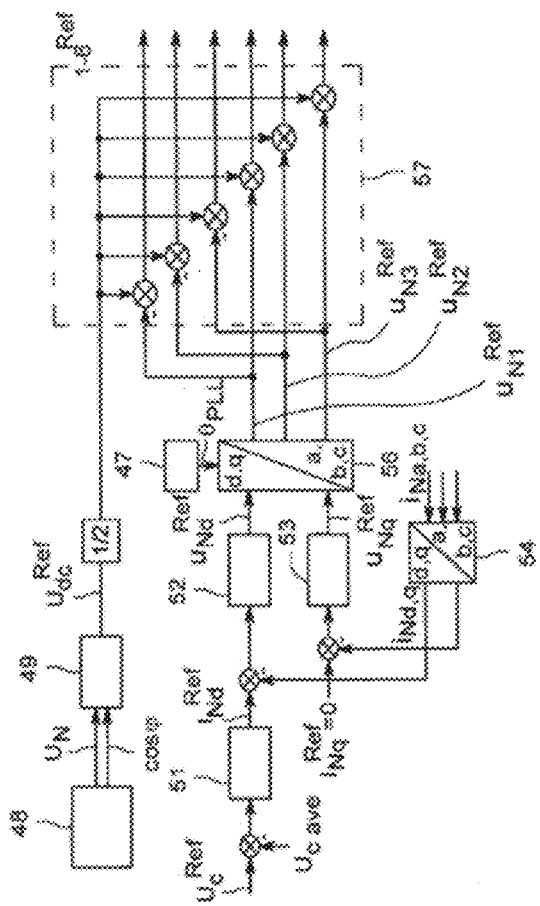
FIG. 9 shows a first implementation example of a control structure for obtaining unipolar currents and additional aspects of the invention in the form of a simplified block diagram.

FIG. 9 shows a simplified block diagram of a first example for implementing a control structure of an AC/DC converter 8 for converting unipolar branch currents. Here e.g. the DC voltage $U_{dc}$ is dynamically adjusted to remain below the critical value of Eq. 9. In the block diagram of FIG. 9, the following functional blocks can be distinguished, which are also optionally referred to as devices: PLL block 47 as a phase-locked loop for synchronization with the AC voltage $U_N$ of the electrical network; block 48 for monitoring the network; block 49 for generating the DC voltage target value; block 51 as a control loop for the capacitor voltage; blocks 52 and 53 as control loops for the currents (d and q components) on the AC side; blocks 54, 56 for transforming the three-phase variables into the d, q coordinate system and vice versa; and block 57 for generating the target values of the phase branch voltages.

The PLL block 47 receives measured values of the alternating voltages $u_N$ of the electrical network and uses a phase-locked loop to generate an angle $\theta_{PLL}$ for positioning the rotating d, q coordinate system SFR (synchronous d, q reference frame) of the controller, in which the voltage vector is aligned with the d-axis.

The network monitoring block 48 determines the magnitude of the mains voltages $u_N$ and the power factor $\cos(\varphi)$. Based on this information, the target value of the DC voltage $U_{dc}^{Ref}$ i.e. the DC component in the references of all 6 phase branch voltages of the converter 8, is set in block 49, such that the condition $U_{dc} < \hat{U}_N \cos(\varphi)$ is satisfied. In this way, it is ensured that the branch current is unipolar or has a positive sign irrespective of the magnitude of the DC current in the intermediate circuit.

The d-axis network current component (in phase with the mains voltage) is used to control the active power transfer through the AC terminals 17A-C of the power converter 8. This component is further used to balance the total amount of energy stored in the DC capacitors 19. Accordingly, the d-component of the mains current target value is prescribes by the capacitor voltage regulator 51. This controller 51 uses the average of all capacitor voltages and prescribes the target value of the d-component of the current $I_{Nd}^{Ref}$.

The q-component of the current is perpendicular to the mains voltage and can be used to control the reactive power and the power factor $\cos(\varphi)$. In the example given, the target value of the q-current component $I_{Nq}^{Ref}$ is set to zero.

The mains current is regulated based on the target values for the alternating voltage components in the phase branches of the power converter 8. Typically, two PI controllers 52, 53 are used to control the d- and q-components of the mains current. The three-phase mains currents are measured and transformed in block 54 into the d- and q-components (SRF), which are used as feedback signals for the closed current control loop.

The current controllers 52, 53 set the AC target values $U_{Nd}^{Ref}$ and $U_{Nq}^{Ref}$ in the d, q coordinate system. After a coordinate transformation (d, q to a, b, c) in block 56, the AC target values $U_{N1}^{Ref}$–$U_{N3}^{Ref}$ are calculated and supplied to block 57.

In block 57, the voltage target values for all phase branches are calculated by combining the DC and AC target values for each phase branch. On average, the phase branch of the converter synthesizes the voltage target values by suitable modulation or pulse-width modulation of the sub-modules of the phase branch.

With the control structure of FIG. 9, the controller can be configured for one or more of the following advantageous operating modes with unipolar branch current. In a first operating mode, it can be set up e.g. for actively influencing the branch current course by superimposing the 2nd harmonic in a circular current, such that the DC current $I_{dc}$ can be adjusted for operation with a unipolar branch current. E.g. let us assume a circular current of the 2nd harmonic with the following value:

$$\hat{I}_{2h} = \frac{2}{3} \cdot \frac{1}{\pi} \cdot \hat{I}_N .$$

The required DC current Idc for operation with a unipolar branch current is then reduced to approximately:

$$I_{dc} > 1,05 \cdot \hat{I}_N \qquad \text{(Eq. 10)}.$$

Figure 10:
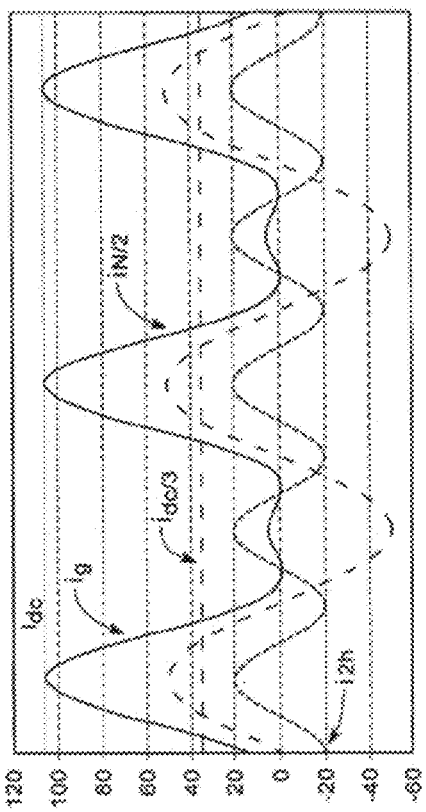
FIG. 10 shows an exemplary course of a branch current in a continuous branch current operating mode according to the invention with superimposed 2nd harmonic of the branch current, in a simplified, idealized representation.

The exemplary courses are shown in the diagram of FIG. 10. In this operating mode, a continuous current flow in a phase branch 11a-c is assumed, whereby an active superimposing of the circular current of the 2nd is performed such that the branch current is positive and the DC current $I_{dc}$ can be reduced to around the level of the peak value Î of the AC current. Accordingly, the branch currents can be influenced by the circular current in their amplitude within certain limits, such that different ratios between the DC and AC voltage side currents and voltages can be achieved.

For the example shown, the peak value of the AC voltage ÛN must be above the value derived below:

$$U_{dc} \cdot I_{dc} \approx \frac{3}{2} \cdot \hat{U}_N \cdot \hat{I}_N \cos(\varphi)$$

$$U_{dc} \cdot I_{dc} \approx \frac{3}{2} \cdot \hat{U}_N \cdot I_{dc} \cos(\varphi) \qquad \text{(Eq. 11)}$$

$$U_{dc} < \frac{3}{2} \cdot \hat{U}_N \cdot \cos(\varphi)$$

As shown in Eq. 11, by superimposing the 2nd harmonic of a circular current, the ratio between the AC and DC voltage of the inverter can be varied or set in a much larger range. This extends the operating range for operation with a unipolar branch current.

In a further operating mode, the controller 28 can be set up to minimize the ripple voltage of the capacitors 19 using unipolar branch currents with superimposed 2nd harmonics of the circular current. Since the superimposition of the 2nd harmonic of the circular current allows various operating points with different ratios between AC and DC voltage, the power converter 8 can be operated at operating points in which both unipolar branch currents are obtained and the ripple voltage of the capacitors of the bridge circuits is minimized. This is an additional aspect of the superimposed circular current of the 2nd harmonic, which can be used to reduce or eliminate the dominant 1st harmonic in the ripple voltage of the capacitors when high power factors $\cos(\varphi)$ are present.

The condition for eliminating the 1st harmonic of the capacitor voltage can be derived from Eq. 7 and the requirement that the power fluctuation of the phase branch for the fundamental frequency is zero, such that the following must apply:

$$-\frac{U_{dc}}{2} \cdot \frac{\hat{I}_N}{2} \cos(\omega t + \varphi) + \frac{I_{dc}}{3} \cdot \hat{U}_N \cdot \cos(\omega t) = 0$$

For large $\cos(\varphi)$, i.e. $\varphi \approx 0$, we obtain $$\frac{U_{dc}}{2} \cdot \frac{\hat{I}_N}{2} = \frac{I_{dc}}{3} \cdot \hat{U}_N$$

and by inserting the power budget according to Eq. 8:

$$\frac{1}{2} \cdot \frac{3}{2} \cdot \hat{U}_N \cdot \frac{\hat{I}_N}{I_{dc}} \cdot \frac{\hat{I}_N}{2} = \frac{I_{dc}}{3} \cdot \hat{U}_N .$$

From this, it results as a necessary condition for which the 1st harmonic can be eliminated in the ripple voltage of the capacitor for a converter operation with a high power factor $\cos(\varphi)$:

$$I_{dc} > \sqrt{\frac{9}{8}} \hat{I}_N \approx 1,06 \cdot \hat{I}_N \qquad \text{(Eq. 12)}$$

From a practical point of view, this term means that the DC current need be only slightly larger than the peak AC current in cases with high power factor $\cos(\varphi)$ to eliminate the ripple of the 1st harmonic in the capacitor voltage.

Figure 11:
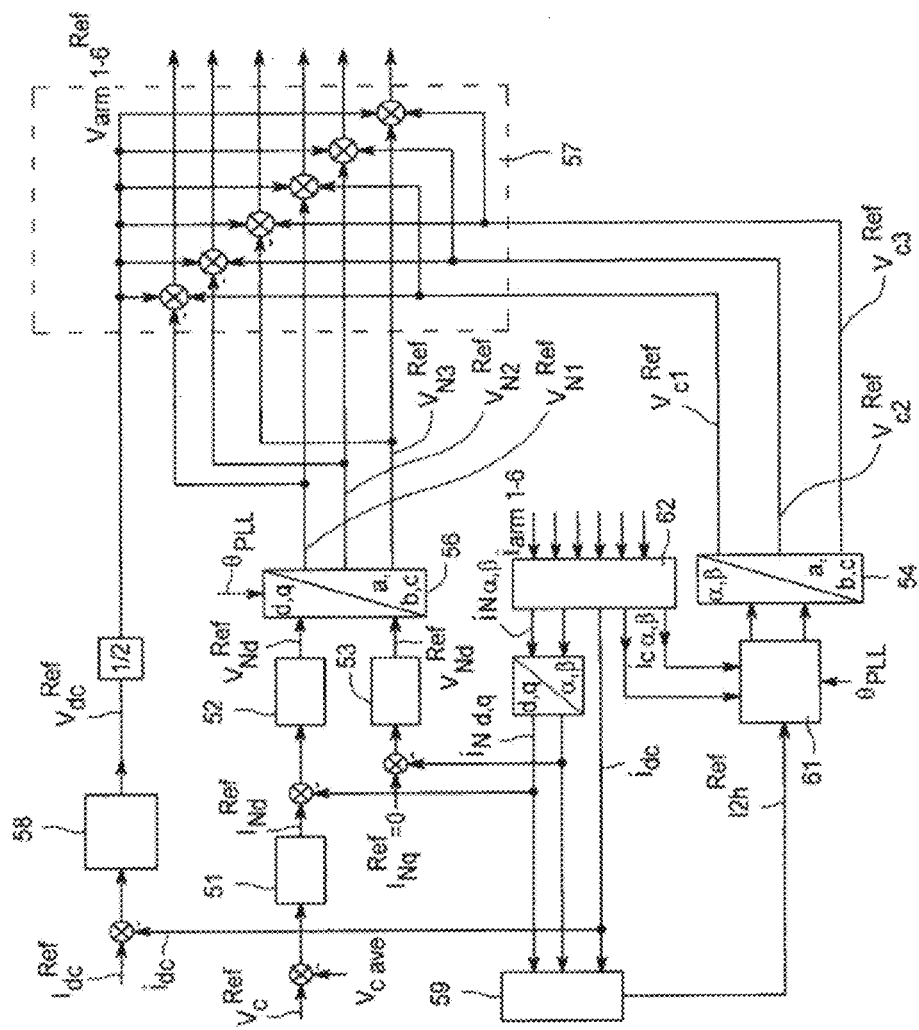
FIG. 11 shows an additional implementation example of a control structure for obtaining unipolar currents and additional aspects of the invention in the form of a simplified block diagram.

FIG. 11 shows a simplified block diagram of a further example for implementing a control structure of an AC/DC converter 8 for converting unipolar branch currents. This control structure is based on an integrated control of the 2nd harmonic of the circular current for influencing the phase branch currents. In the following exemplary embodiment, it is first assumed that the DC current $I_{dc}$ is controlled, whereby the DC voltage $U_{dc}$ varies depending on the load conditions.

In comparison to the control structure according to FIG. 9, the following function blocks are additionally used here: Block 58 for DC control; block 59 for generating the target value of the 2nd harmonic of the circular current; block 61 for circular current control; and block 62 for decomposing the branch currents.

All blocks 47-57 have the same function as in the control structure according to FIG. 9, such that reference can be made in this regard to the above explanations to FIG. 9. Hereafter, only the additional functional blocks 58-62 will be explained in more detail.

The currents on the AC and DC side can be measured separately or determined from the measured phase branch currents. It is also possible to determine the existing circular currents from the phase branch currents of the power converter 8.

In the exemplary embodiment, the direct current $I_{dc}$ is passed through the DC controller 58, which adjusts the level of the DC voltage $U_{dc}$ until the DC current $I_{dc}$ corresponds to the associated target value.

Based on the DC and AC amplitudes, the circular current of the 2nd harmonic is predetermined in block 59 such that the phase branch currents carry a unipolar current.

The target value of the 2nd harmonic is passed to the circular current controller 61, which compares it with the actually existing value of the circular current and corrects the phase branch voltage target values accordingly, in order to obtain a flow of the required circular current of the 2nd harmonic. The actual circular currents are determined by block 62 for decomposing the phase branch currents.

As another example of an operating mode, the controller 28 can be set up to minimize the ripple voltage of the capacitors for operation with constant DC voltage $U_{dc}$. For this purpose, a similar control structure to FIG. 11 can be used. The only difference is that the DC voltage $U_{dc}$ is fixed at the corresponding connection points 12, 13, i.e. the power converter 8 is in the DC voltage control operating mode as in the example of FIG. 9. The following applies accordingly (see Eq. 11):

$$U_{dc} = \frac{3}{2} \cdot \hat{U}_N \cdot \cos(\varphi).$$

A circular current of the 2nd harmonic is superimposed with the following amplitude:

$$\hat{i}_{2h} = \frac{2}{3} \cdot \frac{1}{\pi} \cdot \hat{i}_N \approx 0,21 \cdot \hat{i}_N$$

A circular current of the 2nd harmonic with this amplitude generates unipolar phase branch currents with a minimization of the ripple voltage of the capacitors.

As yet another example of an operating mode for which the controller 28 can be set up, consider again the discontinuous branch current operating mode shown in FIG. 5A. The operating modes described above were subject to the assumption of a continuous, unipolar branch current with an optionally actively controlled circular current of the second harmonic under the condition that the peak value of the AC current is approximately equal to the DC current.

The operating mode with superimposition of the circular current of the 2nd harmonic can be achieved naturally without active regulation. When the DC value is slightly above the peak value of the mains current (e.g. at a factor of 1.05), the phase branch currents are naturally distributed similarly to a 6-pulse bridge rectification. The branch currents then have a discontinuous course with non-conducting phases up to half a period of the fundamental frequency. The resulting branch currents look similar to those with active circular current superimposition and contain the 2nd harmonic with almost the same amplitude. The idealized current waveform shown in FIG. 5B results for each branch current, whereby here the superimposed 2nd harmonic of the circular current is not shown.

It must be noted at this point that the branch currents and the proportion of the 2nd harmonic are achieved indirectly and a constant, steady ratio between the AC and DC sides is present.

Figure 12:
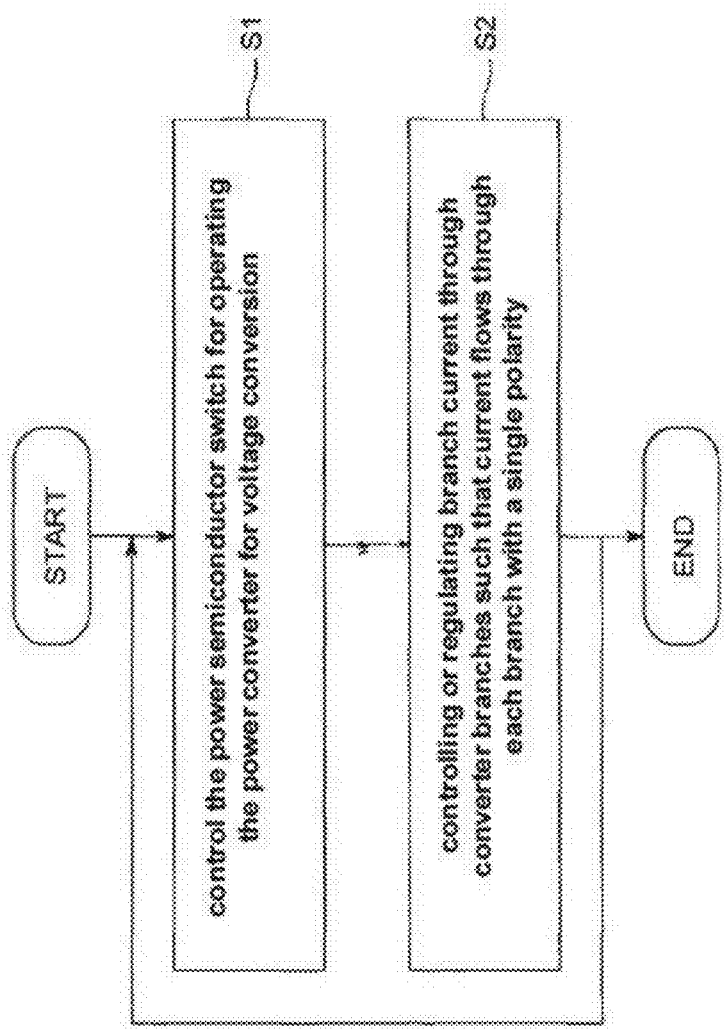
FIG. 12 shows a flow diagram of a method for operating a modular multipoint power converter according to the invention, in a greatly simplified schematic representation.

FIG. 12 shows a method of operating a modular multipoint power converter, e.g. the power converter 8 shown in FIG. 1, which includes a number of converter branches, e.g. 9A-F, each with a number of submodules, e.g. 14, 14', whereby each submodule 14, 14' is formed from a bridge circuit with at least two power semiconductor switches. In step S1, the method comprises controlling the power semiconductor switches, e.g. T1-T4, of all submodules 14, 14' of all converter branches 9A-F depending on the prevailing operating conditions to operate the power converter 8 in order to convert an input-side AC voltage, e.g. $u_N(t)$ of the multipoint power converter into an output-side DC voltage, e.g. $U_{dc}$, or vice versa.

The method further comprises, in step S2, the step of controlling or regulating the branch currents, e.g. $i_q(t)$, through the converter branches 9a-f such that a current $i_q(t)$ flows through each of the converter branches 9A-F with a single polarity. In particular, the branch current resulting from the control or regulation is a continuous, unidirectional or unipolar, substantially sinusoidal current with a DC component which ensures that the branch current is always either positive (or at least non-negative) or negative (or at least non-positive). Alternatively, the current can also be a unidirectional, discontinuous, substantially sinusoidal current with non-conducting phases up to half a period of the fundamental frequency of the AC voltage.

In one embodiment, the method includes the monitoring of at least one variable indicative of a branch current through the power converter branches, and the step S2 of controlling or regulating the branch currents comprises regulating the branch currents depending on the monitored variable.

The monitoring of a variable indicative of a branch current through the converter branches can include measuring the branch currents directly in the respective converter branches 9a-f, in which case the branch currents can be regulated based on the branch current measurements.

Alternatively, the monitoring of a variable indicative of a branch current through the converter branches 9a-f can include measuring a DC intermediate current, e.g. $I_{dc}$, in a DC intermediate circuit of the multipoint power converter 8 and phase currents in AC phase outputs 17a-c, whereby the branch currents based on the measured values of the intermediate circuit DC current and the phase currents can be controlled.

In the method of any type mentioned above, the branch currents can be controlled or regulated based on an increase in the DC current target value or the DC component $I_g$ of a branch current $i_q(t)$ and the intermediate circuit DC current $I_{dc}$.

In advantageous embodiments of the method, the control or regulation of the branch currents can be based on an active superimposition of a circular current of the 2nd harmonic, whereby at the same time an adjustment of the DC voltage is performed. Alternatively or additionally, a modification of the ratios between the AC and DC side currents and voltages of the power converter can be performed at the same time. As a further alternative or in addition, a minimization of the ripple voltage of capacitors of the submodules can be achieved at the same time.

Numerous modifications are possible within the scope of the present invention. For example, the power converter 8 can include more or fewer phases than the three phases shown in FIG. 1. The number of submodules 14, 14' per converter branch is also arbitrary and depends on the application and requirement. While the converter branches are identical here, the converter branches could in principle be designed differently and even asymmetrically. Although in FIG. 1 the power converter 8 is shown as a rectifier which supplies the mains voltage $u_N(t)$ to the DC voltage $U_{dc}$ at its output 6, the power converter 8 can also be set up as an inverter or as a frequency converter. The power converter 8 can be used for various applications for the transformation and distribution of electrical energy, for network coupling, reactive power compensation, high-voltage direct current transmission or electromechanical controls. Instead of the submodules 14, 14' shown, it is also possible to use other submodules, as used e.g. in the initially mentioned EP 1 497 911 B1, except for the half-bridge-based submodules.

A modular multipoint power converter 8 for converting an AC voltage to a DC voltage or vice versa, and a method of operating such a modular multipoint power converter are provided. The multipoint power converter has a plurality of converter branches 9a-f, whereby two converter branches 9a-b, 9c-d, 9e-f are connected to each other respectively to form a phase branch 11a-c of the converter 8. Each converter branch has a number of similar submodules 14, 14', each of which is formed from a half-bridge circuit 18 with power semiconductor switches T1-T4. The branch currents $i_q(t)$ through the converter branches 9a-f are controlled in operation by increasing the DC component $I_g$ of the DC current or the DC intermediate circular current $I_{dc}$ such that a unipolar current, a continuous unipolar sinusoidal current, flows through the converter branches 9a-f. As a result, with the same number of submodules 14, 14' per converter branch 9a-f, the transmissible power can be increased, the power semiconductor elements can be better utilized, or the number of submodules 14, 14' can be reduced while the transmissible power remains the same.

The invention claimed is:

1. A modular multipoint converter for converting an AC voltage into a DC voltage, or vice versa, the modular multipoint converter comprising:
   a plurality of converter branches, whereby each converter branch contains a plurality of submodules, whereby each submodule is formed from a bridge circuit with at least two power semiconductor switches, and
   a controller for controlling the operation of the multipoint power converter, whereby the controller has a control logic arranged to control a branch current through the converter branches such that a unipolar, unidirectional branch current flows through each converter branch, wherein the unipolar, unidirectional branch current is a continuous current or discontinuous current with non-conducting phases up to half a period of the fundamental frequency of the AC voltage, whereby an intermediate circuit DC current is equal or greater than the mains current peak value.

2. The modular multipoint power converter according to claim 1, wherein each converter branch has a series connection of at least two submodules, whereby a first AC voltage terminal of at least one submodule is electrically connected to a second AC voltage terminal of an adjacent submodule.

3. The modular multipoint power converter according to claim 1, wherein it has a plurality of phases corresponding to a plurality of phase branches, connected between a positive and a negative intermediate circuit DC voltage terminal of the multipoint power converter, whereby each phase branch is formed from two similar converter branches series connected to each other, and a connection point between the two converter branches of each phase branch is connected to an AC terminal of the multipoint power converter.

4. The modular multipoint power converter according to claim 1, characterized in that each submodule comprises:
   a half-bridge circuit with two parallel power semiconductor branches connected between a first and a second DC node of the submodule and in which, in each case, at least one controllable power semiconductor switch is arranged, to which a free-wheeling diode is connected in antiparallel; and
   a capacitor in parallel to the half-bridge circuit is connected between the first and second DC nodes.

5. The modular multipoint power converter according to claim 4, wherein each power semiconductor branch has two series-connected power semiconductor switches, each assigned to an antiparallel free-wheeling diode whose connection points form a first or second AC voltage terminal of the submodule.

6. The modular multipoint power converter according to claim 4, wherein the bridge circuit has a first power semiconductor branch with a series circuit of a first power semiconductor switch and a first diode and a second power semiconductor branch has a series circuit comprising a second power semiconductor switch and a second diode, whereby the first and second diodes are arranged in a bridge diagonal of the bridge circuit and each power semiconductor switch is assigned to an antiparallel free-wheeling diode, whereby a connection point between the first power semiconductor switch and the first diodes forms a first AC voltage terminal of the submodule and a connection point between the second power semiconductor switch and the second diodes forms a second AC voltage terminal of the submodule.

7. The modular multipoint power converter according to claim 6, wherein the monitoring device is adapted to measure the branch current directly in each converter branch or an intermediate circuit DC current and phase currents at all AC phase outputs of the multipoint power converter.

8. The modular multipoint power converter according to claim 1, wherein it comprises a monitoring device for monitoring at least one characteristic variable of at least one branch current by a converter branch of the plurality of converter branches.

9. The modular multipoint power converter according to claim 8, wherein the control device comprises a regulating device for regulating the branch current through the plurality of converter branches based on the at least one characteristic variable of the at least one branch current.

10. The modular multipoint power converter according to claim 1, wherein the control logic controls the branch current by increasing a DC component of the branch current or the intermediate circuit DC current.

11. The modular multipoint power converter according to claim 1, wherein the control logic is adapted to superimpose a circular current of the 2nd harmonic on a branch current to achieve an operation with the unipolar, unidirectional branch current while adjusting the DC voltage or by modifying the ratios between the AC and DC side currents and voltages of the power converter.

12. The modular multipoint power converter according to claim 11, wherein the control logic has a controller unit for regulating the circular currents of the 2nd harmonic that are to be superimposed.

13. The modular multipoint power converter according to claim 1, wherein the control logic is adapted to superimpose a circular current of the 2nd harmonic on a branch current to achieve an operation with the unipolar, unidirectional branch current while minimizing the ripple voltage of capacitors of the submodules.

14. A method of operating a modular multipoint power converter including a plurality of converter branches having a plurality of submodules, whereby each submodule is formed from a bridge circuit with at least two power semiconductor switches, whereby the method includes:
controlling the power semiconductor switches of all submodules to operate the power converter in order to convert an input-side AC voltage of the multipoint power converter into an output-side DC voltage or vice versa; and
controlling or regulating the branch currents through the converter branches such that a unipolar, unidirectional branch current flows through the converter branches in each case wherein the unipolar, unidirectional branch current is a continuous current or a discontinuous current with non-conducting phases up to half a period of the fundamental frequency of the AC voltage.

15. The method according to claim 14, wherein it further comprises the monitoring of at least one variable indicative of a branch current through the converter branches, whereby the control or regulation of the branch currents may include regulating the branch currents dependent on the monitored variable.

16. The method according to any of claim 14, wherein the control or regulation of the branch currents takes place based on an increase in a DC component of a branch current or an intermediate circuit DC current.

17. The method according to claim 14, wherein the control or regulation of the branch currents takes place based on an active superimposition of a circular current of the 2nd harmonic to simultaneously achieve at least one of the following: Adaptation of the DC voltage; modification of the relationships between the AC and DC side currents and voltages of the power converter; and/or minimization of the ripple voltage of capacitors of the submodules.

* * * * *